United States Patent
Park et al.

(10) Patent No.: US 9,941,533 B2
(45) Date of Patent: Apr. 10, 2018

(54) METHOD FOR GENERATING INJECTION CURRENT FOR FUEL CELL STACK AND APPARATUS FOR PERFORMING THE SAME

(71) Applicant: HYUNDAI AUTRON CO., LTD., Seongnam-si (KR)

(72) Inventors: Hyun-Seok Park, Gunpo-si (KR); Sun-Doo Kang, Seongnam-si (KR); Jin-Ho Cho, Yongin-si (KR)

(73) Assignee: HYUNDAI AUTRON CO., LTD., Seongnam-si (KR)

( * ) Notice: Subject to any disclaimer, the term of this patent is extended or adjusted under 35 U.S.C. 154(b) by 622 days.

(21) Appl. No.: 14/564,654

(22) Filed: Dec. 9, 2014

(65) Prior Publication Data

US 2015/0180057 A1   Jun. 25, 2015

(30) Foreign Application Priority Data

Dec. 20, 2013 (KR) .................. 10-2013-0159894

(51) Int. Cl.
*H01M 8/04* (2016.01)
*H01M 8/04858* (2016.01)
*H01M 8/04537* (2016.01)
*H01M 8/04664* (2016.01)

(52) U.S. Cl.
CPC ....... *H01M 8/0491* (2013.01); *H01M 8/0488* (2013.01); *H01M 8/04597* (2013.01); *H01M 8/04679* (2013.01)

(58) Field of Classification Search
None
See application file for complete search history.

(56) References Cited

U.S. PATENT DOCUMENTS

| | | | |
|---|---|---|---|
| 2006/0074574 A1* | 4/2006 | Gasda | H01M 8/04559 702/63 |
| 2012/0053766 A1 | 3/2012 | Ham et al. | |
| 2014/0159738 A1* | 6/2014 | Jeong | H01M 8/04649 324/430 |

FOREIGN PATENT DOCUMENTS

| | | |
|---|---|---|
| CN | 1758066 A | 4/2006 |
| CN | 101578193 A | 11/2009 |
| CN | 102905448 A | 1/2013 |
| DE | 102 02 172 A1 | 8/2003 |
| DE | 11 2008 003 491 T5 | 10/2010 |
| DE | 10 2011 005 966 A1 | 9/2012 |
| EP | 1 646 101 A2 | 4/2006 |
| JP | 2010-32490 A | 2/2010 |
| KR | 10-2010-0051511 A | 5/2010 |
| KR | 10-1090705 B1 | 12/2011 |

(Continued)

*Primary Examiner* — Eli Mekhlin

(74) *Attorney, Agent, or Firm* — Morgan, Lewis & Bockius LLP

(57) ABSTRACT

An apparatus for generating injection current for a fuel cell stack includes a first converter configured to convert direct current of a voltage corresponding to a battery for a vehicle, into direct current of a predetermined voltage; a second converter configured to convert the converted direct current into alternating current; a filter configured to filter a signal of a predetermined frequency band from the converted alternating current; and a control unit configured to perform a feedback control to allow the filtered alternating current to be injected without being distorted when injecting the filtered alternating current into the fuel cell stack.

9 Claims, 3 Drawing Sheets

(56) References Cited

FOREIGN PATENT DOCUMENTS

KR  10-1246353 B1  3/2013
KR  10-1294565 B1  8/2013

\* cited by examiner

METHOD FOR GENERATING INJECTION CURRENT FOR FUEL CELL STACK AND APPARATUS FOR PERFORMING THE SAME

CROSS REFERENCE TO RELATED APPLICATION

This application claims the benefit of Korean Patent Application No. 10-2013-0159894, filed on Dec. 20, 2013, entitled "METHOD FOR GENERATING INJECTION CURRENT FOR FUEL CELL STACK AND APPARATUS FOR PERFORMING THE SAME", which is hereby incorporated by reference in its entirety into this application.

BACKGROUND

1. Technical Field

The present disclosure relates to a method for generating injection current for a fuel cell stack and an apparatus for performing the same.

2. Related Art

A fuel cell is a kind of a power generating device which does not convert the chemical energy of a fuel into heat by combustion but converts the chemical energy into electrical energy by an electrochemical reaction in a stack, and may be used to not only supply industrial power, home power and vehicle driving power but also supply power to a small electric/electronic product, particularly, a portable device.

As a power supply source for driving a vehicle, a polymer electrolyte membrane fuel cell (PEMFC) (a proton exchange membrane fuel cell) having the highest power density among fuel cells has been currently studied mainly. The polymer electrolyte membrane fuel cell has a rapid start time and a rapid power converting reaction time due to a low operation temperature.

The polymer electrolyte membrane fuel cell is configured to include a membrane electrode assembly (MEA) in which catalyst electrode layers in which electrochemical reactions occur are attached to both sides of a solid polymer electrolyte membrane through which hydrogen ions pass, gas diffusion layers (GDL) which serve to uniformly distribute reaction gases and transfer generated electrical energy, gaskets and coupling mechanisms which maintain airtightness of the reaction gases and a coolant and an appropriate coupling pressure, and bipolar plates which move the reaction gases and the coolant.

When a fuel cell stack is assembled using the configuration of a unit cell as described above, the combination of the membrane electrode assembly and the gas diffusion layers, which are main parts, is positioned in the innermost portion of the cell. The membrane electrode assembly has the catalyst electrode layers applied with catalysts to allow hydrogen and oxygen to react with each other, that is, an anode and a cathode, on both surfaces of the polymer electrolyte membrane, and the gas diffusion layers, the gaskets, and so forth are stacked on the outer sides of the anode and the cathode.

The bipolar plates formed with flow fields, through which the reaction gases (hydrogen as a fuel and oxygen or air as an oxidizer) are supplied and the coolant passes, are positioned on the outer sides of the gas diffusion layers. After a plurality of unit cells each having the above-mentioned configuration are stacked, current collectors, insulating plates, and end plates for supporting the stacked cells are coupled to outermost portions. The fuel cell stack is configured by repeatedly stacking and coupling the unit cells between the end plates.

In order to obtain the potential actually required in a vehicle, unit cells should be stacked to correspond to the required potential, and the structure formed by stacking the unit cells is referred to as a stack. The potential generated by one unit cell is about 1.3V. Therefore, in order to generate the power required for driving a vehicle, a plurality of cells are stacked in series.

SUMMARY

Various embodiments are directed to a method for generating injection current for a fuel cell stack and an apparatus for performing the same, in which a closed-loop control is performed to be fed back with alternating current, instead of using a decoupling capacitor, to allow alternating current to be added to stack current without being distorted and flow to a load, whereby it is possible to reduce the cost of parts and decrease a volume, attributable to nonuse of the decoupling capacitor.

Objects to be solved by the present invention are not limited to the above-mentioned object, and other objects that are not mentioned may be clearly understood by those skilled in the art in the following description.

In an embodiment, an apparatus for generating injection current for a fuel cell stack may include: a first converter configured to convert direct current of a voltage corresponding to a battery for a vehicle, into direct current of a predetermined voltage; a second converter configured to convert the converted direct current into alternating current; a filter configured to filter a signal of a predetermined frequency band from the converted alternating current; and a control unit configured to perform a feedback control to allow the filtered alternating current to be injected without being distorted when injecting the filtered alternating current into the fuel cell stack.

The apparatus may further include a current sensor configured to sense a value of actual injection current of the fuel cell stack, and provide the sensed value to the control unit.

The control unit may check a difference between actual alternating current received from the current sensor and the alternating current.

The control unit may control an amplitude of the alternating current when the difference occurs between the actual alternating current and the alternating current as a result of checking.

The control unit may increase the amplitude of the alternating current when a value of the actual alternating current is smaller than a value of the alternating current.

The control unit may decrease the amplitude of the alternating current when a value of the actual alternating current is larger than a value of the alternating current.

The first converter may boost the direct current of the voltage corresponding to the battery for a vehicle, and convert the direct current to the direct current of the predetermined voltage.

The second converter may convert the direct current into the alternating current by controlling a pulse width of the converted direct current.

The filter may generate the alternating current in the form of a sine wave, by passing a region of the converted alternating current corresponding to a low frequency and blocking a region of the converted alternating current corresponding to a high frequency.

In an embodiment, a method for generating injection current for a fuel cell stack, performed in an apparatus for generating injection current for a fuel cell stack, may include: converting direct current of a voltage corresponding to a battery for a vehicle, into direct current of a predetermined voltage; converting the converted direct current into alternating current; filtering a signal of a predetermined frequency band from the converted alternating current; and performing a feedback control to allow the filtered alternating current to be injected without being distorted when injecting the filtered alternating current into the fuel cell stack.

The method may further include receiving actual alternating current injected into the fuel cell stack.

The performing of the feedback control to allow the filtered alternating current to be injected without being distorted may include checking whether a difference occurs between the received actual alternating current and the alternating current.

The checking of whether the difference occurs between the actual alternating current and the alternating current may include controlling an amplitude of the alternating current when the difference occurs between the actual alternating current and the alternating current as a result of checking.

The controlling of the amplitude of the alternating current may include increasing the amplitude of the alternating current when a value of the actual alternating current is smaller than a value of the alternating current.

The controlling of the amplitude of the alternating current may include decreasing the amplitude of the alternating current when a value of the actual alternating current is smaller than a value of the alternating current.

The converting of the direct current into the direct current of the predetermined voltage may include boosting the direct current of the voltage corresponding to the battery for a vehicle, and converting the direct current into the direct current of the predetermined voltage.

The converting of the converted direct current into the alternating current may include converting the direct current into the alternating current by controlling a pulse width of the converted direct current.

The filtering of the signal of the predetermined frequency band may include generating the alternating current in the form of a sine wave, by passing a region of the converted alternating current corresponding to a low frequency and blocking a region of the converted alternating current corresponding to a high frequency.

Specific matters of other exemplary embodiments will be included in a detailed description and the accompanying drawings.

Advantages and/or features of the present invention and methods to achieve them will be elucidated from exemplary embodiments described below in detail with reference to the accompanying drawings. However, the present invention is not limited to exemplary embodiment disclosed below, but will be implemented in various forms. The exemplary embodiments of the present invention make disclosure of the present invention thorough and are provided so that the scope of the present invention is fully conveyed to those skilled in the art. Therefore, the present invention will be defined by the scope of the appended claims. Like reference numerals denote like elements throughout the description.

DETAILED DESCRIPTION

A conventional apparatus for diagnosing a fault of a fuel cell stack determines whether a fault has occurred or not, by injecting alternating current into a fuel cell stack, detecting the voltage of the fuel cell stack, and calculating a total harmonic distortion (THD) using a result of analysis.

When sinusoidal alternating current is used by being added to operating current, the voltage of a normal cell is changed in a linear section, and the voltage of an abnormal cell is changed in a nonlinear section. The current of the fuel cell stack is the sum of the operating current and the sinusoidal alternating current.

When measuring the voltage of the fuel cell stack according to the current of the fuel cell stack, the voltage of the normal cell has a low THD according to a change in cell current, whereas the voltage of the abnormal cell has a large amplitude and a high THD according to a change in cell current.

The THD is measured as the sum of harmonic components versus the fundamental frequency of the injected alternating current. The conventional apparatus for diagnosing a fault of a fuel cell stack may determine whether a fault has occurred or not, by calculating the THD through frequency analysis of the voltage of the fuel cell stack and diagnosing the voltages of cells.

The conventional apparatus for diagnosing a fault of a fuel cell stack is configured by three main elements, i.e., the injection unit of the fuel cell stack, a unit for measuring the voltage of the fuel cell stack, and a fault diagnosing unit.

In order to diagnose a fault of a fuel cell stack by using a THD, alternating current is injected into the fuel cell stack. The alternating current may be injected into the fuel cell stack through a decoupling capacitor which blocks the direct current applied from the fuel cell stack and passes alternating current.

However, in the case where the frequency of the alternating current is low, the distortion of the alternating current may occur as the alternating current of a low frequency passes through the decoupling capacitor. In order to minimize the occurrence of such a phenomenon, since a decoupling capacitor with markedly large capacity should be used, problems may be caused in that the cost of parts and a volume increase.

In order to cope with this problem, embodiments of the present disclosure suggest a method for generating injection current for a fuel cell stack and an apparatus for performing the same, in which a closed-loop control is performed to be fed back with alternating current, instead of using a decoupling capacitor, to allow alternating current to be added to stack current without being distorted and flow to a load.

Hereinafter, exemplary embodiments of the present invention will be described in detail with reference to the accompanying drawings.

Figure 1:
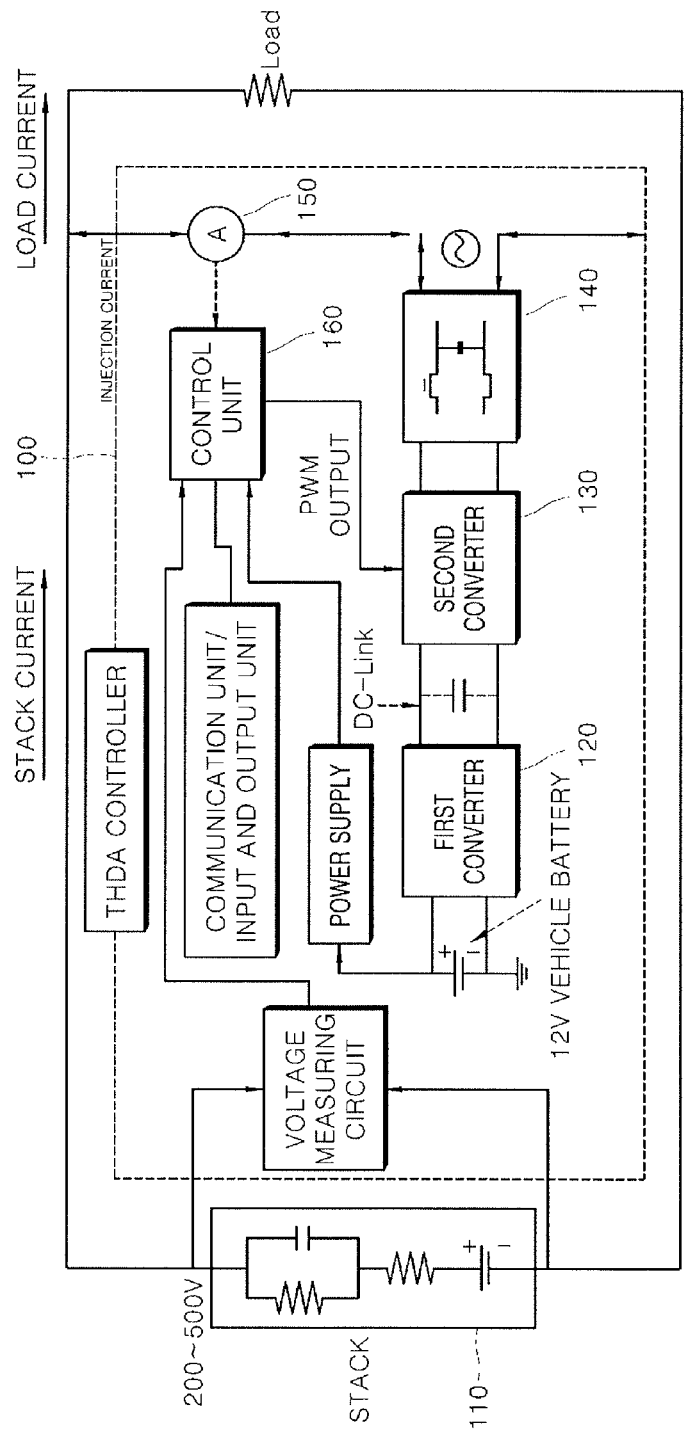
FIG. 1 is a block diagram of an apparatus for generating injection current for a fuel cell stack in accordance with an embodiment.

FIG. 1 is a block diagram of an apparatus for generating injection current for a fuel cell stack in accordance with an embodiment.

Referring to FIG. 1, an apparatus 100 for generating injection current for a fuel cell stack includes a fuel cell stack 110, a first converter 120, a second converter 130, a filter 140, a current sensor 150, and a control unit 160.

The fuel cell stack 110 is configured as a plurality of unit cells are continuously arranged. Such a fuel cell stack 110 generates direct current, and alternating current controlled by the control unit 160 may be injected into the fuel cell stack 110. That is to say, in order to prevent collision of the direct current generated from the fuel cell stack 110 and the alternating current injected into the fuel cell stack 110, the alternating current injected into the fuel cell stack 110 is controlled by the control unit 160 to become the same as the actual injection current sensed by the current sensor 150. Such a process will be described later in detail when explaining the control unit 160.

The first converter 120 boosts the direct current of a voltage corresponding to a battery for a vehicle to direct current of a predetermined voltage, and provides the direct current of the predetermined voltage to the second converter 130. The first converter 120 may boost the direct current of the voltage corresponding to the battery for a vehicle, to a voltage corresponding to the DC-Link of FIG. 1, and the DC-Link is set to be higher than the voltage of the direct current applied to the fuel cell stack 110. For example, the first converter 120 may be a DC-DC converter which boots a voltage to 500V to 600V by using a 12V vehicle battery, and such a DC-DC converter may be an isolation DC-DC converter to be isolated from a high voltage (that is, the voltage (200V to 500V) of the fuel cell stack 110).

When the second converter 130 receives the direct current of the predetermined voltage from the first converter 120, it converts the direct current into alternating current, and provides the converted alternating current to the filter 140.

In an embodiment, when the direct current of the predetermined voltage is received from the first converter 120, the second converter 130 may control the pulse width of the direct current, and thereby convert the direct current into the alternating current. For example, the second converter 130 may convert the direct current into the alternating current by using a pulse width modulation (PWM) scheme. Such a second converter 130 may be a DC-AC converter.

In order that the alternating current converted by the second converter 130 is converted into alternating current in the form of a sine wave, it is necessary to filter the signal of a preset frequency band. To this end, the filter 140 filters the signal of the preset frequency band (for example, 300 Hz) when the alternating current is received from the second converter 130, and outputs the filtered alternating current.

In an embodiment, the filter 140 may generate the alternating current in the form of a sine wave, by passing a region of the alternating current corresponding to a low frequency and blocking a region of the alternating current corresponding to a high frequency. Such a filter 140 may be a low pass filter.

The current sensor 150 senses the actual alternating current injected into the fuel cell stack 110, and provides the actual alternating current to the control unit 160. In an embodiment, the current sensor 150 may sense the actual injection current filtered by the filter 140 and injected into the fuel cell stack 110, and provide the actual injection current to the control unit 160.

When the actual alternating current is received from the current sensor 150, the control unit 160 checks whether a difference has occurred between the actual alternating current and injection alternating current, and controls the amplitude of the injection alternating current according to a checking result. The control unit 160 repeatedly performs such a process until a difference does not occur between the actual alternating current and the injection alternating current.

In an embodiment, when the value of the actual alternating current is smaller than the value of the injection alternating current, the control unit 160 may control the second converter 130 to perform a conversion into the alternating current through increasing the amplitude of the injection alternating current. In this way, as the control unit 160 controls the second converter 130 to perform a conversion into the alternating current through increasing the amplitude of the alternating current, the value of the injection alternating current is increased.

In an embodiment, when the value of the actual alternating current is larger than the value of the injection alternating current, the control unit 160 may control the second converter 130 to perform a conversion into the alternating current through decreasing the amplitude of the injection alternating current. In this way, as the control unit 160 controls the second converter 130 to perform a conversion into the alternating current through decreasing the amplitude of the alternating current, the value of the injection alternating current is decreased.

Figure 2:
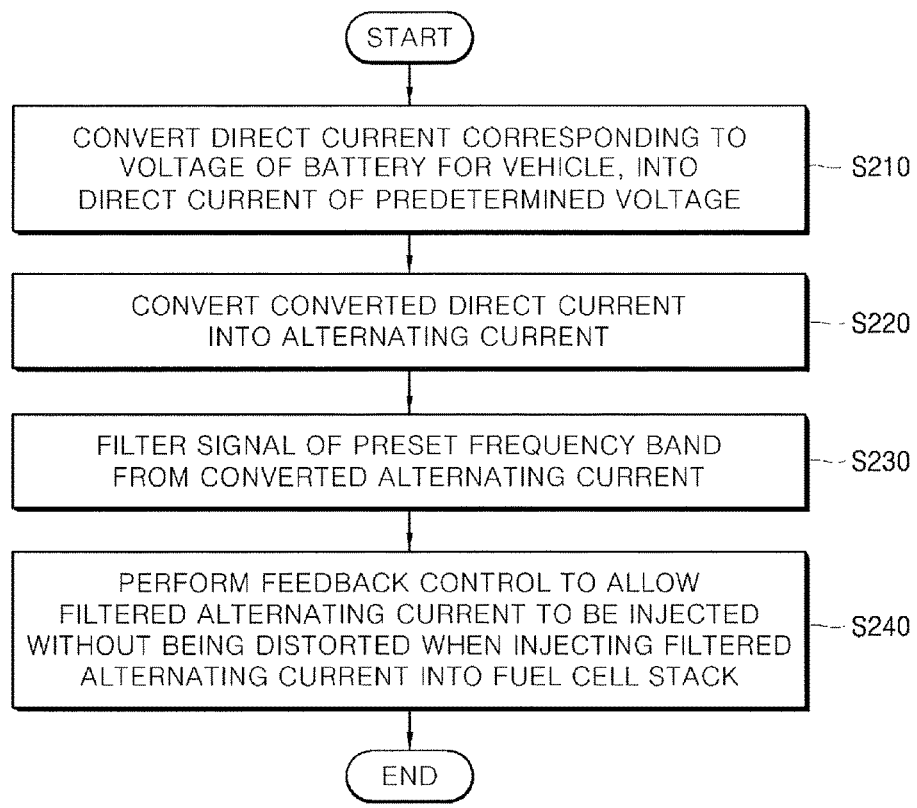
FIG. 2 is a flow chart explaining a method for generating injection current for a fuel cell stack in accordance with an embodiment.

FIG. 2 is a flow chart explaining a method for generating injection current for a fuel cell stack in accordance with an embodiment.

Referring to FIG. 2, the apparatus 100 for generating injection current for a fuel cell stack converts the direct current of a voltage corresponding to a battery for a vehicle into the direct current of a predetermined voltage (S210). The apparatus 100 for generating injection current for a fuel cell stack converts the converted direct current into alternating current (S220). The apparatus 100 for generating injection current for a fuel cell stack filters the signal of a predetermined frequency band from the converted alternating current (S230). The apparatus 100 for generating injection current for a fuel cell stack performs a feedback control to allow the filtered alternating current to be injected without being distorted when injecting the filtered alternating current into a fuel cell stack (S240).

Figure 3:
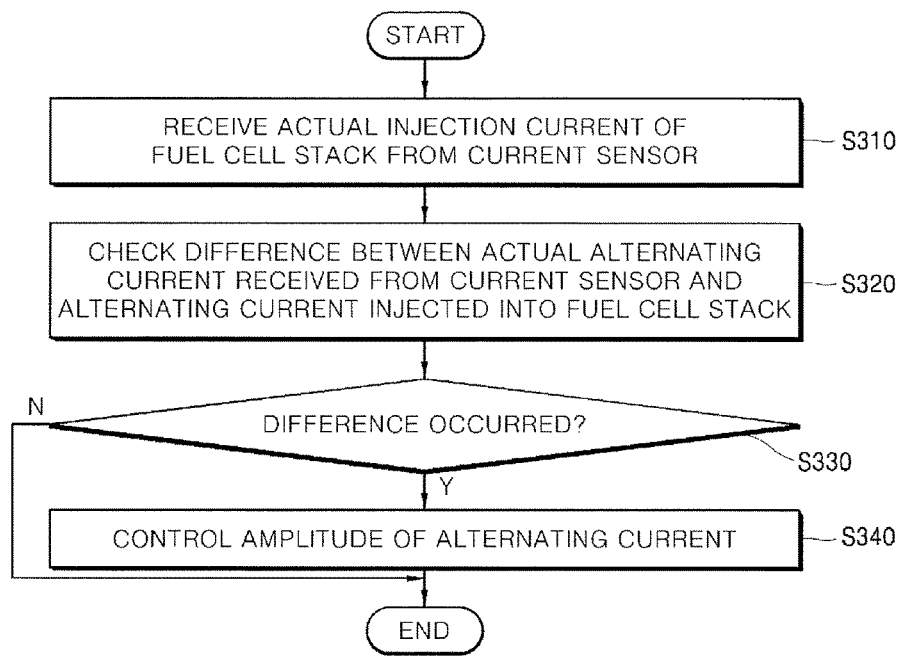
FIG. 3 is a flow chart explaining a method for generating injection current for a fuel cell stack in accordance with an embodiment.

FIG. 3 is a flow chart explaining a method for generating injection current for a fuel cell stack in accordance with an embodiment.

Referring to FIG. 3, the apparatus 100 for generating injection current for a fuel cell stack receives the actual injection current of a fuel cell stack from a current sensor (S310). The apparatus 100 for generating injection current for a fuel cell stack checks the difference between the actual alternating current received from the current sensor and the alternating current injected into the fuel cell stack (S320). When the difference has occurred between the actual alternating current and the alternating current, as a result of checking (S330), the apparatus 100 for generating injection current for a fuel cell stack controls the amplitude of the alternating current (S340).

As is apparent from the above descriptions, according to the embodiments, a closed-loop control is performed to be fed back with alternating current, instead of using a decoupling capacitor, to allow alternating current to be added to stack current without being distorted and flow to a load, whereby it is possible to reduce the cost of parts and decrease a volume, attributable to nonuse of the decoupling capacitor.

Hereinabove, although specific exemplary embodiments of the present invention have been described, various modifications may be made without departing from the scope of the present invention. Accordingly, the scope of the present invention is not construed as being limited to the described exemplary embodiments, but should be defined by the following claims as well as equivalents thereof.

Although the present invention has been described with reference to the exemplary embodiments and the accompanying drawings, it is not limited to the above-mentioned exemplary embodiments, but may be variously modified and altered from the above description by those skilled in the art to which the present invention pertains. Therefore, the scope and spirit of the present invention should be understood only by the following claims, and all of the equivalences and equivalent modifications of the claims should be intended to fall within the scope and spirit of the present invention.

What is claimed is:

1. An apparatus for generating an injection alternating current for a fuel cell stack, comprising:
   a first converter configured to convert direct current of a voltage corresponding to a battery for a vehicle, into direct current of a predetermined voltage, wherein the voltage corresponding to the battery for the vehicle is lower than a voltage of the fuel cell stack;
   a second converter connected to the first converter and configured to convert the direct current output from the first converter into alternating current;
   a filter connected to the second converter and configured to filter a signal of a predetermined frequency band from the alternating current output from the second converter to generate a filtered alternating current; and
   a control unit connected to the fuel cell stack and the filter and configured to perform a feedback control according to difference between an actual alternating current of the fuel cell stack and the injection alternating current to allow the filtered alternating current output from the filter to be injected into the fuel cell stack without being distorted when injecting the filtered alternating current.

2. The apparatus according to claim 1, further comprising:
   a current sensor connected to the control unit and the filter and configured to sense and provide the filtered alternating current to the control unit to form the actual alternating current, wherein the filtered alternating current sensed by the current sensor is injected into the fuel cell stack to form the injection alternating current.

3. The apparatus according to claim 2, wherein the control unit checks a difference between the actual alternating current received from the current sensor and the injection alternating current injected into the fuel cell stack.

4. The apparatus according to claim 3, wherein the control unit controls an amplitude of the alternating current when the difference occurs between the actual alternating current and the injection alternating current as a result of checking.

5. The apparatus according to claim 4, wherein the control unit increases the amplitude of the alternating current when a value of the actual alternating current is smaller than a value of the injection alternating current.

6. The apparatus according to claim 4, wherein the control unit decreases the amplitude of the alternating current when a value of the actual alternating current is larger than a value of the injection alternating current.

7. The apparatus according to claim 1, wherein the first converter boosts the direct current of the voltage corresponding to the battery for a vehicle, and converts the direct current to the direct current of the predetermined voltage.

8. The apparatus according to claim 1, wherein the second converter converts the direct current into the alternating current by controlling a pulse width of the converted direct current.

9. The apparatus according to claim 1, wherein the filter generates the alternating current in the form of a sine wave, by passing a region of the converted alternating current corresponding to a low frequency and blocking a region of the converted alternating current corresponding to a high frequency.

* * * * *